United States Patent
Jacobs et al.

(10) Patent No.: US 11,199,110 B2
(45) Date of Patent: Dec. 14, 2021

(54) THRUST REVERSER COWL RACK

(71) Applicant: American Airlines, Inc., DFW Airport, TX (US)

(72) Inventors: Lloyd Gregory Jacobs, Oologah, OK (US); Bill Monroe Brown, Jr., Sapulpa, OK (US); Mark Greenhaw, Tulsa, OK (US)

(73) Assignee: American Airlines, Inc., DFW Airport, TX (US)

( * ) Notice: Subject to any disclaimer, the term of this patent is extended or adjusted under 35 U.S.C. 154(b) by 0 days.

(21) Appl. No.: 17/151,600

(22) Filed: Jan. 18, 2021

(65) Prior Publication Data

US 2021/0317757 A1    Oct. 14, 2021

Related U.S. Application Data

(60) Continuation of application No. 16/384,778, filed on Apr. 15, 2019, now Pat. No. 10,895,171, which is a continuation of application No. 15/293,066, filed on Oct. 13, 2016, now Pat. No. 10,260,375, which is a division of application No. 12/710,137, filed on Feb. 22, 2010, now Pat. No. 9,470,108.

(51) Int. Cl.
  *F01D 25/28*    (2006.01)
  *F02K 1/54*     (2006.01)
  *B64F 5/50*     (2017.01)

(52) U.S. Cl.
  CPC .............. *F01D 25/285* (2013.01); *B64F 5/50* (2017.01); *F02K 1/54* (2013.01); *F05D 2220/323* (2013.01); *Y10T 29/49998* (2015.01)

(58) Field of Classification Search
  CPC ........ F01D 25/285; B64F 5/50; B64F 5/0036; F02K 1/54; F05D 2220/323; B65D 2585/6882; B65D 2585/687; B65D 2585/6877
  See application file for complete search history.

(56) References Cited

U.S. PATENT DOCUMENTS

| | | | | |
|---|---|---|---|---|
| 561,631 | A * | 6/1896 | Wadley | B65H 31/3027 414/789.9 |
| 1,956,120 | A * | 4/1934 | Cowl | B65B 67/04 53/145 |
| 2,168,205 | A * | 8/1939 | Harten | C23G 3/00 294/67.3 |
| 3,114,535 | A * | 12/1963 | Burch | B63C 3/06 254/127 |
| 3,401,806 | A * | 9/1968 | Schmit | B63C 3/06 414/678 |
| 3,476,404 | A * | 11/1969 | Rachman | A61G 5/12 280/30 |

(Continued)

*Primary Examiner* — Bayan Salone
(74) *Attorney, Agent, or Firm* — Pramudji Law Group PLLC; Ari Pramudji

(57) ABSTRACT

A rack for holding a portion of a thrust reverser. The rack may include a base and a supporting frame disposed perpendicularly with the base. The base and the supporting frame may include a hinge at each location where the base and the supporting frame are coupled together. The rack may also include two supporting poles parallel to the supporting frame. The two supporting poles may be designed such that the portion of the thrust reverser may be mounted onto the two supporting poles.

20 Claims, 7 Drawing Sheets

(56) References Cited

U.S. PATENT DOCUMENTS

| | | | | |
|---|---|---|---|---|
| 4,239,196 | A * | 12/1980 | Hanger | B25H 1/0007 269/17 |
| 4,315,711 | A * | 2/1982 | Koscho | B65G 65/24 211/49.1 |
| 4,509,894 | A * | 4/1985 | Rolfe | B60P 1/6427 414/555 |
| 4,592,695 | A * | 6/1986 | McConnell | A61G 5/104 297/DIG. 4 |
| 4,618,035 | A * | 10/1986 | Mao | A45C 3/004 16/113.1 |
| 4,934,720 | A * | 6/1990 | Dobron | B62B 5/0083 108/56.1 |
| 5,133,275 | A * | 7/1992 | Maurizio | B63B 23/32 114/259 |
| 5,193,479 | A * | 3/1993 | Bielefeld | B63B 23/32 114/259 |
| 5,664,652 | A * | 9/1997 | Shamah | A45C 5/14 190/103 |
| RE36,170 | E * | 3/1999 | Lilja | B65D 85/68 414/343 |
| 6,000,903 | A * | 12/1999 | Hatch | B65D 85/68 206/319 |
| D440,477 | S * | 4/2001 | Pappas | D8/71 |
| 6,234,741 | B1 * | 5/2001 | McDaniel | B60P 1/00 254/10 R |
| 6,379,034 | B1 * | 4/2002 | Schutz | B65G 65/23 366/185 |
| 6,443,688 | B1 * | 9/2002 | Komdeur | B65G 7/08 280/47.12 |
| 6,932,020 | B2 * | 8/2005 | Everett | B63B 27/143 114/362 |
| 7,431,245 | B2 * | 10/2008 | Smith | F16M 13/02 248/27.1 |
| 9,249,733 | B2 * | 2/2016 | Hallam | F02C 7/20 |
| 9,470,108 | B2 * | 10/2016 | Jacobs | B64F 5/50 |
| 9,714,585 | B2 * | 7/2017 | Morey | B62B 3/02 |
| 10,260,375 | B2 * | 4/2019 | Jacobs | F02K 1/54 |
| 10,895,171 | B2 * | 1/2021 | Jacobs | B64F 5/50 |
| 2002/0085902 | A1 * | 7/2002 | Worrel | B65G 1/02 414/276 |
| 2007/0092366 | A1 * | 4/2007 | Bose | B66F 9/082 414/607 |
| 2007/0205055 | A1 * | 9/2007 | Renshaw | B66F 9/20 187/222 |
| 2011/0204006 | A1 * | 8/2011 | Jacobs | F01D 25/285 211/13.1 |
| 2011/0296813 | A1 * | 12/2011 | Frank | F02K 1/09 60/230 |
| 2012/0279064 | A1 * | 11/2012 | Reinhardt | F01D 25/285 29/888 |
| 2017/0030225 | A1 * | 2/2017 | Jacobs | F01D 25/285 |

* cited by examiner

THRUST REVERSER COWL RACK

RELATED APPLICATIONS

This patent application is a continuation application of U.S. patent application Ser. No. 16/384,778, filed 2019 Apr. 15 and titled THRUST REVERSER COWL RACK, which is a continuation of U.S. patent application Ser. No. 15/293,066, filed 2016 Oct. 13, now U.S. Pat. No. 10,260,375, and titled THRUST REVERSER COWL RACK, which is a divisional of U.S. patent application Ser. No. 12/710,137, filed 2010 Feb. 22, now U.S. Pat. No. 9,470,108, and titled THRUST REVERSER COWL RACK, each of which are incorporated herein by reference in their entirety.

FIELD OF THE INVENTION

Implementations of various technologies described herein generally relate to a fixture that may be used to hold a core cowl of a thrust receiver. More specifically, various technologies described herein generally relate to a rack for holding a core cowl of a thrust reverser while repair or work is being performed on the core cowl.

DESCRIPTION OF THE RELATED ART

The following descriptions and examples do not constitute an admission as prior art by virtue of their inclusion within this section. Aircraft typically use thrust reversers to reverse the direction of the aircraft's thrust and create a drag force to oppose the aircraft's motion. A typical thrust reverser for use with aircraft engines may include two semicircular duct halves known as a cowl. The cowl of the thrust reverser may include an inner or core cowl and an outer cowl. The cowl may be aerodynamically shaped such that it is narrower at the rear than at the front.

In order to reverse the direction of the aircraft's thrust, the outer cowl of thrust reverser may slide into a position over the core cowl of the thrust reverser such that the exhaust from the aircraft's engine is redirected from the back of the aircraft to the front of the aircraft.

As part of a maintenance program for a thrust reverser, inspection or repair of the inner wall area of the core cowl may be required. Given the enormous size and weight of the thrust reverser's core cowl, maintenance on the thrust reverser core cowl's inner wall components is typically performed while the thrust reverser core cowl is lying horizontally on the floor. This position may require that a technician work underneath the thrust reverser's core cowl while the technician is lying on his back.

SUMMARY

Described herein are implementations of various technologies of a rack used to hold a portion of a thrust reverser. In one implementation, the rack may include a base and a supporting frame disposed perpendicularly with the base. The base and the supporting frame may include a hinge at each location where the base and the supporting frame are coupled together. The rack may also include two supporting poles parallel to the supporting frame. The two supporting poles may be designed such that the portion of the thrust reverser may be mounted onto the two supporting poles.

In another implementation, the rack may be designed to hold a core cowl of a thrust reverser. Here, the two supporting poles may be designed such that the core cowl of the thrust reverser may be mounted onto the two supporting poles.

Described herein are also implementations of various techniques for positioning a core cowl of the thrust reverser in an upright position using the rack. The method may include coupling the core cowl to the rack. The rack may be positioned such that the supporting frame is horizontally disposed on a floor. The method may further include rotating the rack such that the base is lying on the floor and the supporting frame is standing in an upright position.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
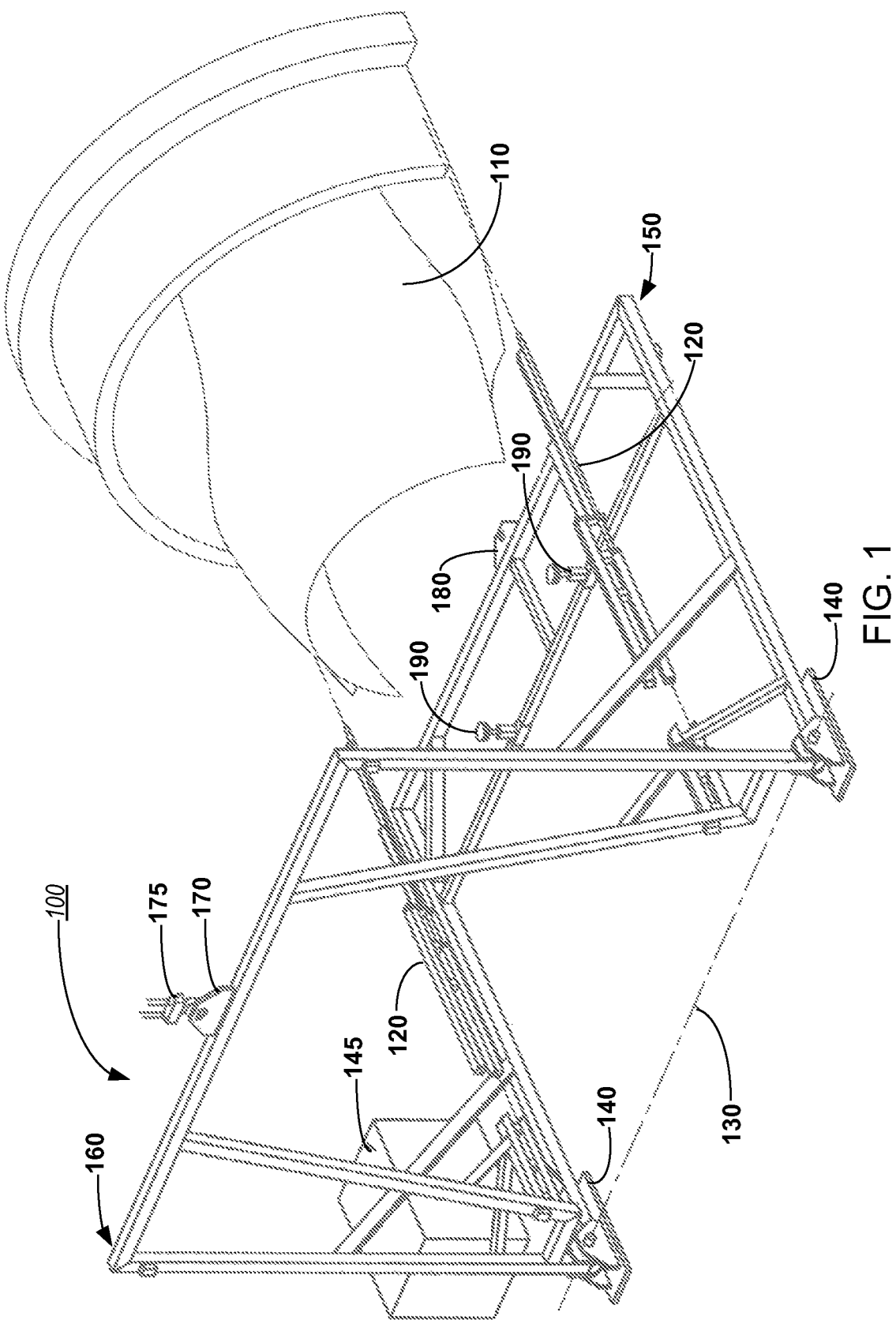
FIG. 1 illustrates a perspective view of a thrust reverser core cowl rack and a thrust reverser core cowl in accordance with implementations of various technologies described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief description or summary of various technologies and techniques directed at a thrust reverser core cowl rack and for using same to hold a thrust reverser core cowl in a vertical position.

The thrust reverser core cowl rack includes a pair of supporting devices (or poles), a pair of hinges, a supporting frame, a base, a balance hoist, a lift hoist and stabilizers. The hinges are used to couple the supporting frame to the base. The supporting frame and the base are positioned at ninety degrees to each other. The hinges allow the supporting frame and the base to rotate around the hinges' axis, while keeping the ninety degree angle between each other. The pair of supporting devices is positioned above and parallel to the supporting frame. The pair of supporting devices is also horizontally separated by a predetermined distance that is equal to the horizontal distance between two receptacles on the thrust reverser core cowl. The receptacles on the thrust reverser are typically used to couple an outer cowl of the thrust reverser to the core cowl of the thrust reverser. As such, the pair of supporting devices is designed to use the receptacles that are already on the core cowl of the thrust reverser.

In one implementation, the supporting frame may include a lifting hoist such that a crane may be coupled to the supporting frame via the lifting hoist. Similarly, the base may include a balance hoist such that another crane may be coupled to the base via the balance hoist. In another implementation, the hinges may include a hydraulic pump that may be used to push the supporting frame or the base off of the ground and rotate the thrust reverser core cowl rack ninety degrees.

In operation, the thrust reverser core cowl rack may be initially positioned such that its supporting devices are parallel to the floor. The thrust reverser core cowl may then be coupled to the supporting devices by mounting the receptacles of the thrust reverser core cowl onto the supporting devices. In one implementation, the thrust reverser core cowl may be coupled to the supporting devices by lifting the thrust reverser core cowl and sliding the receptacles of the thrust reverser core cowl onto the supporting devices using a crane.

After the thrust reverser core cowl is coupled to the supporting devices, one or more stabilizers and fasteners may be used to secure the thrust reverser core cowl to the thrust reverser core cowl rack. After securing the thrust reverser core cowl to the thrust reverser core cowl rack, a first crane may be coupled to the lifting hoist on the thrust reverser core cowl rack, and a second crane may be coupled to the balancing hoist on the opposite end of the thrust reverser core cowl rack. The first crane may lift the lifting hoist such that the horizontal portion of the thrust reverser core cowl rack may be rotated ninety degrees from a horizontal position to a vertical position. While the first crane is lifting the lifting hoist, the second crane may be used to balance the weight of the thrust reverser core cowl. After rotating the thrust reverser core cowl rack ninety degrees, the thrust reverser core cowl may be hanging vertically on the supporting devices. Although the thrust reverser core cowl rack has been described as being rotated using two cranes, it should be noted that in other implementations the thrust reverser core cowl rack may be rotated using the hydraulic pump instead.

Various implementations of the thrust reverser core cowl rack and various techniques for using same to hold a thrust reverser core cowl in a vertical position will now be described in more detail with reference to FIGS. 1-7 and in the following paragraphs.

FIG. 1 illustrates a perspective view of a thrust reverser core cowl rack 100 and a thrust reverser core cowl 110 in accordance with various implementations described herein. The thrust reverser cowl rack 100 (e.g., rack 100) may include a pair of supporting devices 120, a pair of hinges 140, a hydraulic pump 145, a supporting frame 150, a base 160, a balance hoist 170, a balance crane 175, a lift hoist 180 and stabilizers 190. FIG. 1 also shows half of a thrust reverser's core cowl 110 (e.g., cowl 110) to illustrate how the cowl 110 may couple to the rack 100. Additional details as to how the cowl 110 may couple to the rack 100 are provided below with reference to FIG. 6.

FIG. 1 illustrates the rack 100 in an initial position with the supporting frame 150 positioned on the floor. The supporting frame 150 is coupled to the base 160 such that the angle between the supporting frame 150 and the base 160 is ninety degrees. The supporting frame 150 is coupled to the base 160 via the hinges 140. The hinges 140 allow the supporting frame 150 and the base 160 to rotate together as one unit around a rotating axis 130, while maintaining the ninety degree angle between the supporting frame 150 and the base 160. The rotating axis 130 travels through the center of two hinges 140. The hinges 140 may be coupled to the floor in order to stabilize the rack 100.

The supporting frame 150 may include a lifting hoist 180 such that a crane or other lifting device may couple to the lifting hoist 180 and lift the supporting frame 150. The base 160 may include a balance hoist 170 such that a crane or other lifting mechanism may provide support to the base 160 while the supporting frame 150 is being lifted. The balance crane 175 illustrates how a crane may be coupled to the balance hoist 170.

As mentioned above, the rack 100 may include a hydraulic pump 145. In lieu of or in combination with using the balance crane 175, the hydraulic pump 145 may be used to push the supporting frame 150 off of the ground and rotate the rack 100 along the rotating axis 130 until the base 160 is lying on the floor and the supporting frame 150 is in a vertical position.

In the initial position of the rack 100, the supporting devices 120 are positioned above the supporting frame 150 parallel with the supporting frame 150. The supporting devices 120 are coupled to the base 160 such that they may be located above the supporting frame 150 and at a predetermined horizontal distance apart from each other. The predetermined horizontal distance is equal to the horizontal distance between two receptacles on the cowl 110. In one implementation, the supporting devices may be shaped as cylindrical poles such that they may fit into the receptacles on the cowl 110.

Each side of the cowl 110 includes a receptacle such that the supporting devices 120 may slide into the receptacles of the cowl 110. The receptacles on the cowl 110 may be commonly referred to as a T-track. Typically, the receptacles on the cowl 110 are used to couple the outer cowl of the thrust reverser to the core cowl (e.g., cowl 110) of the thrust reverser. When used together, the outer cowl may slide across the receptacles such that the exhaust air coming from the engine is redirected to the front of an aircraft in order to reverse the thrust of the aircraft. The receptacles may be cylindrical in shape. The receptacles are more clearly shown in FIG. 5, which will be discussed in the paragraphs below.

The supporting frame 150 may include stabilizers 190 to provide support between the supporting frame 150 and the cowl 110. In one implementation, after the cowl 110 is fixed onto the supporting devices 120, the stabilizers 190 may be used to support the weight of the cowl 110 on the supporting frame 150. The stabilizers 190 may be adjustable in height such that the cowl 110 may be locked into position against the supporting frame 150. The stabilizers 190 may be coupled to a cross bar that connects the two parallel ends of the supporting frame 150. The stabilizers 190 may be adjustable such that they may move across the crossbar and may be fixed at any position along the crossbar.

Figure 2:
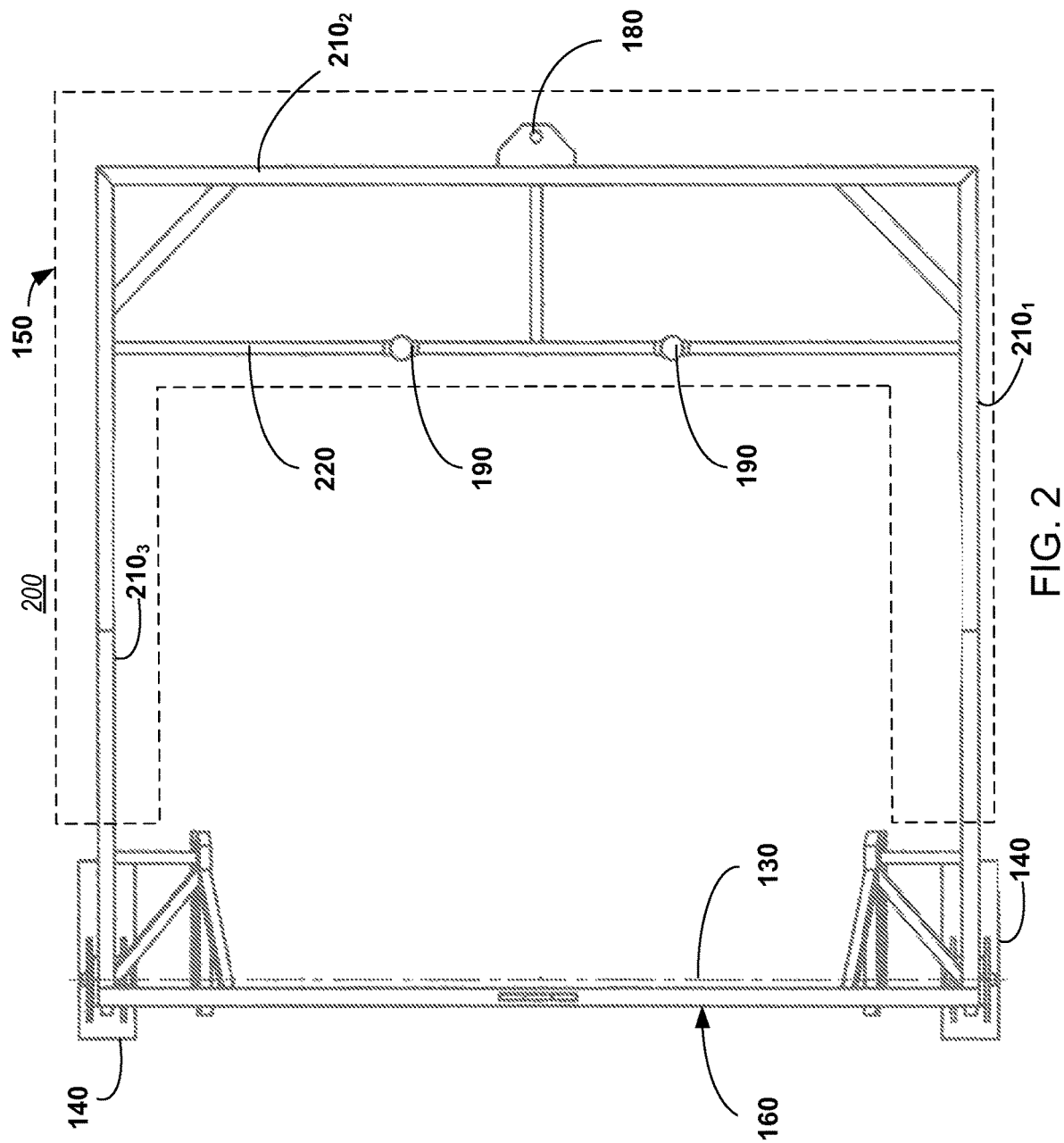
FIG. 2 illustrates a top view of a thrust reverser core cowl rack in accordance with implementations of various technologies described herein.

FIG. 2 illustrates a top view 200 of the thrust reverser core cowl rack 100 in accordance with implementations of various techniques described herein. The following description of the top view 200 of the thrust reverser core cowl rack is made with reference to the perspective view of a thrust reverser core cowl rack 100 in FIG. 1. Since FIG. 2 provides a top view of the rack 100, the supporting frame 150 is clearly illustrated. As seen in FIG. 2, the supporting frame 150 consists of three outer bars (i.e., outer bar $210_1$, outer bar $210_2$ and outer bar $210_3$) that are each coupled with each other such that the angle between each adjacent bar is ninety degrees. In one implementation, the two parallel outer bars (i.e., outer bar $210_1$ and outer bar $210_3$) of the supporting frame 150 may be coupled together with a cross bar 220.

In one implementation, the cross bar 220 may be parallel to the outer bar $210_2$. However, it should be noted that in other implementations, the cross bar 220 does not need to be parallel to the outer bar $210_2$. The supporting frame 150 may also include one or more additional bars that may be coupled to any of the outer bars 210 or the cross bar 220 in order to provide structural support for the rack 100. The additional bars may also provide additional support for the rack 100 such that when the cowl 110 is coupled to the rack 100, the structural integrity of the rack 100 may not be compromised due to the weight of the cowl 110.

The lift hoist 180, the stabilizers 190, the hinges 140 and the rotating axis 130 illustrated in FIG. 2 correspond to the description provided above with respect to FIG. 1. However, although only one lifting hoist 180 and two stabilizers 190 are illustrated in both FIGS. 1 and 2, it should be noted that in other implementations additional lifting hoists 180 and stabilizers 190 may be used. In one implementation, fewer than two stabilizers 190 may also be coupled on the cross bar 210.

Figure 3:
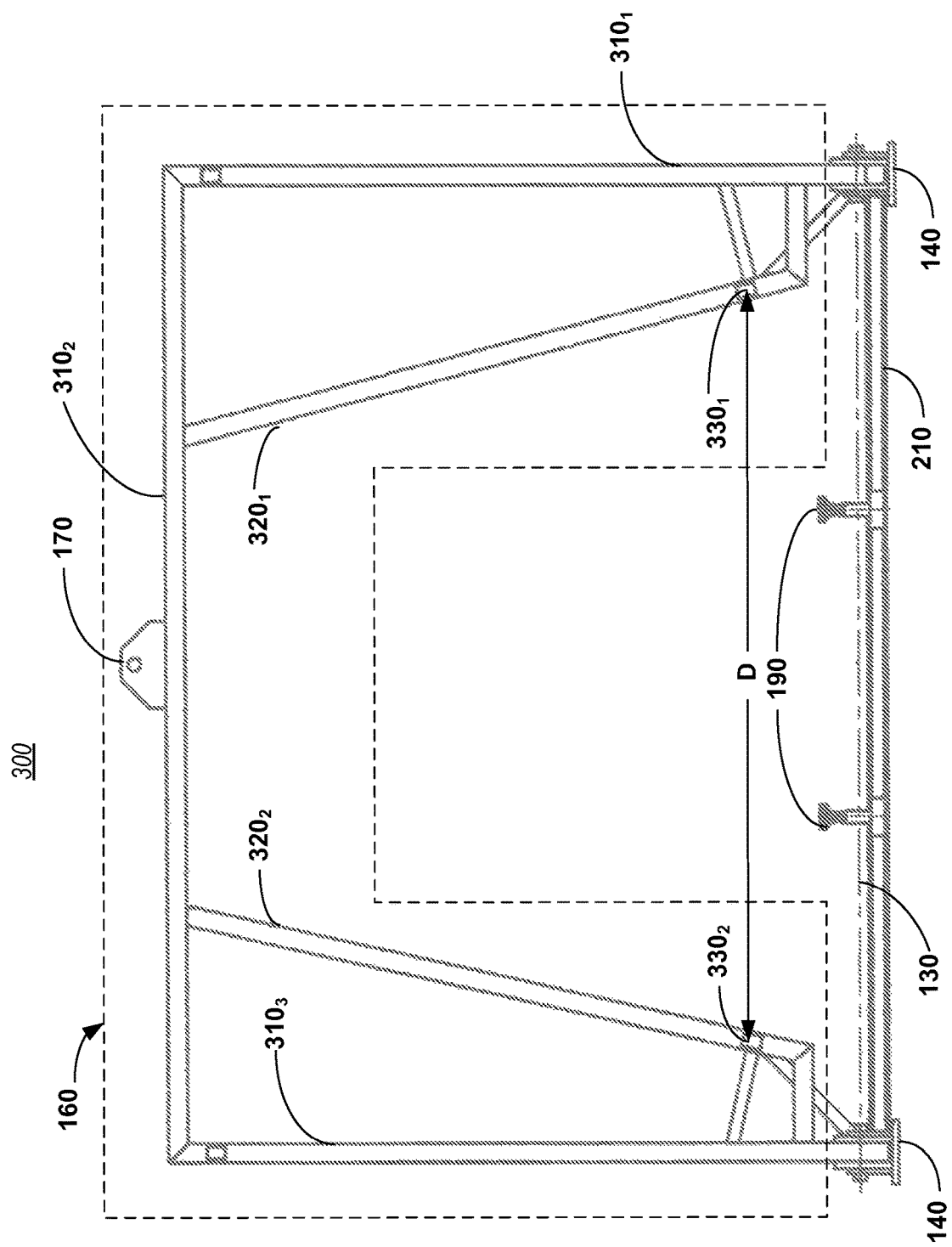
FIG. 3 illustrates a front view of a thrust reverser core cowl rack in accordance with implementations of various technologies described herein.

FIG. 3 illustrates a front view of a thrust reverser core cowl rack in accordance with implementations of various techniques described herein. The following description of the front view 300 of the thrust reverser core cowl rack 100 is made with reference to the perspective view of the thrust reverser core cowl rack 100 in FIG. 1 and the top view 200 of the thrust reverser core cowl rack 100 in FIG. 2. Since FIG. 3 provides a front view of the rack 100, the base 160 is clearly illustrated. As seen in FIG. 3, the base 160 consists of three outer bars (i.e., bar $310_1$, bar $310_2$ and bar $310_3$) that are each coupled with each other such that the angle between each adjacent bar is ninety degrees.

In addition to the outer bars 310, the base 160 may include inner angled bars 320. The inner angled bars 320 may couple two adjacent outer bars 310 together. For instance, angled bar $320_1$ is coupled to outer bar $310_1$ and outer bar $310_2$. Located along each angled bar 320 is a supporting device position 330. The supporting device positions 330 indicate points on the angled bars 320 where the supporting devices 120 may be attached. The distance D between the two supporting device positions 330 may correspond to the predetermined distance between the supporting devices 120 described above with reference to FIG. 1. In one implementation, the distance D may be determined based on the thickness of the cowl 110.

Like the supporting frame 150, the base 160 may also include one or more additional bars that may be coupled to any of the outer bars 310 or the angled bars 320 to provide structural support for the rack 100. The additional bars may also provide additional support for the supporting devices 120 and the rack 100 such that when the cowl 110 is coupled to the supporting devices 120, the structural integrity of the supporting devices 120 or the rack 100 may not be compromised due to the weight of the cowl 110.

The balance hoist 170, the stabilizers 190, the hinges 140 and the rotating axis 130 illustrated in FIG. 3 correspond to the same descriptions provided above with respect to FIG. 1. Although only one balance hoist 170 is illustrated in both FIGS. 1 and 3, it should be noted that in other implementations additional balance hoists 170 may be used.

Figure 4:
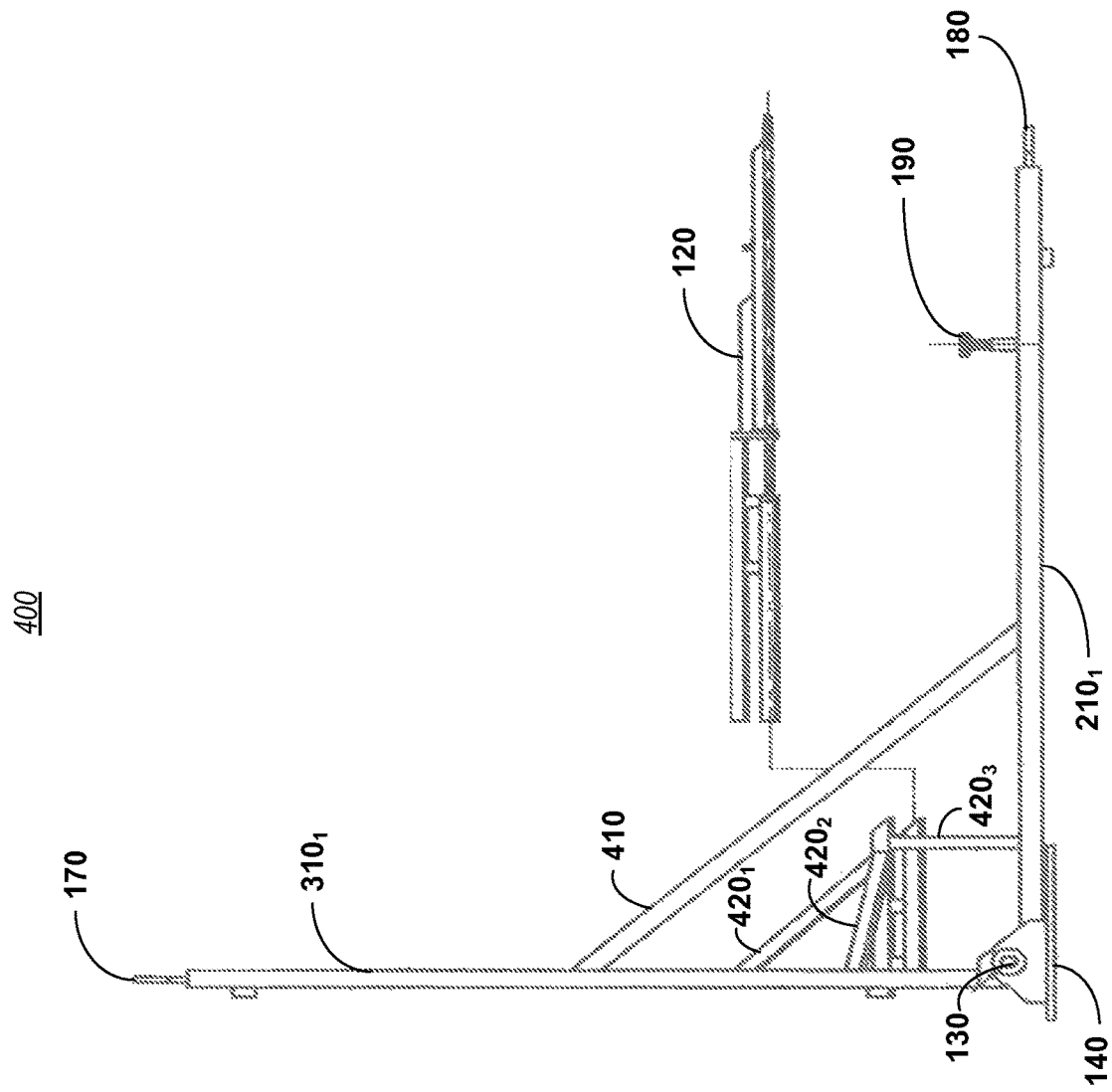
FIG. 4 illustrates a side view of a thrust reverser core cowl rack in accordance with implementations of various technologies described herein.

FIG. 4 illustrates a side view 400 of a thrust reverser core cowl rack 100 in accordance with implementations of various techniques described herein. The following description of the side view 400 of the thrust reverser core cowl rack 100 is made with reference to the perspective view of the thrust reverser core cowl rack 100 in FIG. 1, the top view 200 of the thrust reverser core cowl rack 100 in FIG. 2 and the front view 300 of the thrust reverser core cowl rack 100 in FIG. 3. Since FIG. 4 provides a side view 400 of the rack 100, FIG. 4 clearly illustrates how outer bar $210_1$ and outer bar $310_1$ (e.g., representative of the supporting frame 150 and base 160) are coupled together via the hinge 140. In FIG. 4, the supporting device 120 is separated from the base 160 for illustrative purposes only.

The side view 400 of the rack 100 illustrates a base support bar 410 and supporting device support bars 420. The base support bar 410 may be coupled to outer bar $210_1$ of the supporting frame 150 and to outer bar $310_1$ of the base 160 to provide structural support for the rack 100 when the cowl 110 is coupled to the supporting devices 120. Similarly, a second base support bar may be coupled to outer bar $210_3$ of the supporting frame 150 and to outer bar $310_3$ of the base 160 to also provide structural support for the rack 100 when the cowl 110 is coupled to the supporting devices 120.

The thrust reverser core cowl rack 100 may also include supporting device support bars 420, such as supporting device support bar $420_1$, supporting device support bar $420_2$ and supporting device support bar $420_3$. Supporting device support bar $420_1$ may be positioned between angled bar $320_1$ and one of the supporting devices 120. Supporting device support bar $420_2$ may be positioned between outer bar $310_1$ and one of the supporting devices 120. Supporting device bar $420_3$ may be positioned between outer bar $210_1$ and one of the supporting devices 120. The supporting device support bars 420 may be used to provide structural support to the supporting devices 120 such that the supporting devices 120 may support the weight of the cowl 110 when the cowl 110 is coupled to the supporting devices 120. Although only three supporting device support bars 420 are illustrated in FIG. 4, it should be noted that in other implementations the number of supporting device support bars 420 may include more support bars or fewer support bars than the three supporting device support bars 420 that are illustrated in FIG. 4.

Figure 5:
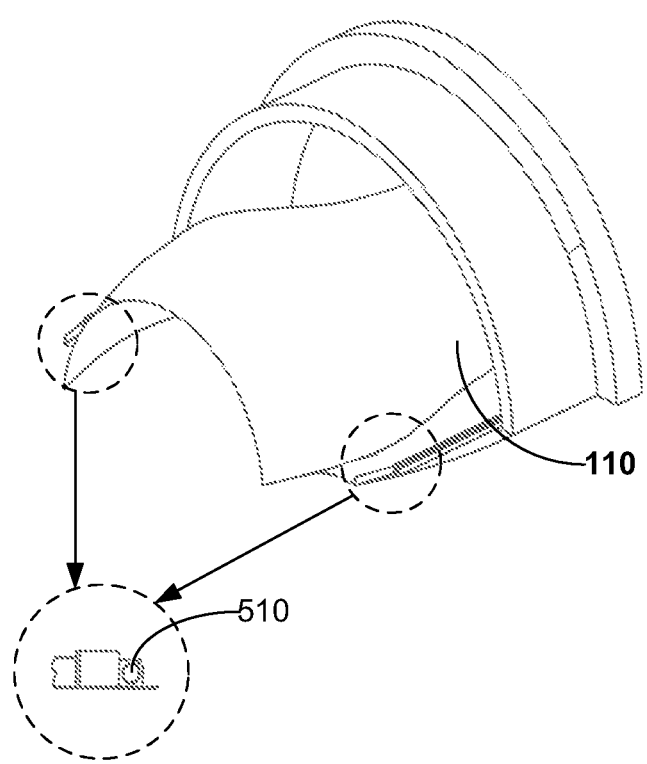
FIG. 5 illustrates a front view of a receptacle on a thrust reverser core cowl in accordance with implementations of various technologies described herein.

FIG. 5 illustrates a front view of a receptacle 510 on a thrust reverser core cowl in accordance with implementations of various technologies described herein. The following description of the receptacle 510 is made with reference to the perspective view of the thrust reverser core cowl rack 100 in FIG. 1. The receptacles 510 are located on each side of the thrust reverser core cowl. As mentioned above, the receptacles 510 on the cowl 110 may be referred to as a T-track and are typically used to couple the outer cowl of the thrust reverser to the core cowl (e.g., cowl 110) of the thrust reverser. In this manner, the supporting device 120 is designed to have the same shape as the part of the outer cowl of the thrust reverser that couples to the receptacle 510. The receptacles 510 may extend to a depth such that most of the supporting devices 120 may fit within the receptacles 510.

Figure 6:
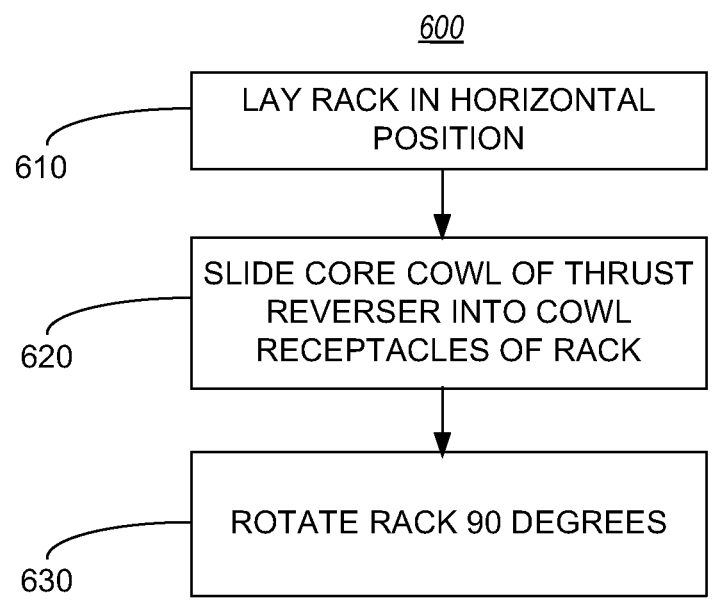
FIG. 6 illustrates a flow diagram of a method for vertically positioning a thrust reverser core cowl using a thrust reverser core cowl rack according to one or more implementations of various techniques described herein.

FIG. 6 illustrates a flow diagram of a method 600 for vertically positioning a thrust reverser core cowl using a thrust reverser core cowl rack 100 according to one or more implementations of various techniques described herein. The following description of the flow diagram of method 600 is made with reference to the thrust reverser cowl rack 100 of FIG. 1, various elements from FIG. 5 and FIG. 7.

At step 610, the rack 100 may be positioned such that the supporting devices 120 are parallel with the floor. As such, the supporting frame 150 may be positioned against the floor.

At step 620, the cowl 110 may be coupled to the rack 100 via the supporting devices 120. In one implementation, in order to couple the cowl 110 to the rack 100, the cowl 110 may first be lifted using a crane and positioned in front of the supporting devices 120 such that the front of the cowl 110 is facing the supporting devices 120. The receptacles 510 on each side of the cowl 110 may then be mounted onto the supporting devices 120. After the cowl 110 is mounted on the supporting devices 120 via the receptacles 510, the stabilizers 190 may be positioned to keep the cowl 110 stable. The height of the stabilizers 190 may be adjusted. In one implementation, fasteners may also be coupled between the supporting frame 150 and the inside of the cowl 110 to provide additional support to stabilize the cowl 110.

At step 630, the rack 100 may be rotated ninety degrees such that the supporting frame 150 moves from a horizontal position to a vertical position. In one implementation, in order to rotate the rack 100, a first crane (e.g., lifting crane 185 in FIG. 7) may be coupled to the lifting hoist 180 and a second crane (e.g., balance crane 175 in FIG. 1) may be coupled to the balance hoist 170. Once the lifting hoist 180 and the balance hoist 170 have been coupled to their respective cranes, the first crane may lift the supporting frame 150 by lifting the lifting hoist 180. At the same time, the second crane may be used to ensure that the rack 100 is rotated carefully. In this manner, as the first crane lifts the lifting hoist 180, the second crane may lower the balance hoist 170 to create equal vertical forces on the rack 100. The first crane may lift the lifting hoist 180 until the supporting frame 150 and the supporting devices 120 are in a vertical position. Once the rack 100 has been rotated, the base 160 may be in a horizontal position lying against the floor and the supporting frame 150 stands in a vertical position perpendicular to the floor. As a result of this rotation, the cowl 110 now stands in an upright position. In this position, work may be performed on the inner wall components of the cowl 110 with fewer hazards and more accuracy than when the cowl 110 is laid horizontally on the floor.

Although the rack 100 has been described herein as being rotated using cranes, it should be noted that in other implementations the rack 100 may be rotated using the hydraulic pump 145. The hydraulic pump 145 may be configured to push the supporting frame 150 off of the ground and rotate the rack 100 ninety degrees. The hydraulic pump 145 may also be configured to provide support on the base 160 while rotating the supporting frame 150.

Figure 7:
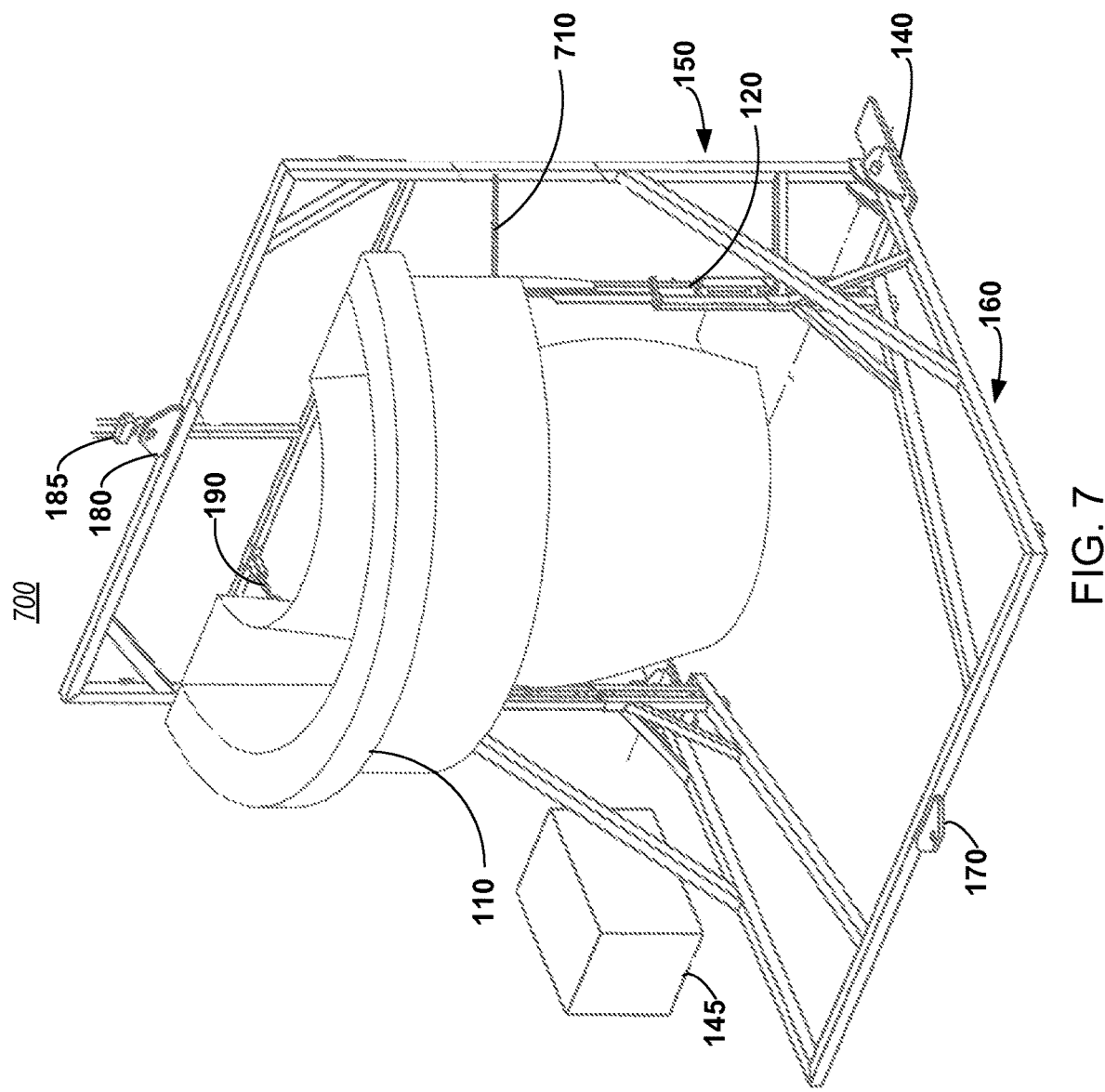
FIG. 7 illustrates perspective view of a thrust reverser core cowl rack that has been rotated in accordance with implementations of various technologies described herein.

FIG. 7 illustrates a thrust reverser core cowl rack that has been rotated in accordance with implementations of various techniques described herein. The following description of the thrust reverser core cowl rack 700 is made with reference to the perspective view of the thrust reverser core cowl rack 100 in FIG. 1 and method 600 in FIG. 6. As seen in FIG. 7, the supporting frame 150 has been rotated from a horizontal position to a vertical position. Consequently, the base 160 has now been rotated from a vertical position to a horizontal position. Likewise, because the cowl 110 is attached to the rack 100, the cowl 110 has also been rotated from a horizontal position to a vertical position perpendicular to the floor, i.e., in an upright position.

FIG. 1 illustrates the position of the rack 100 and the cowl 110 in step 610 of method 600. After rotating the rack 100 ninety degrees (e.g., step 630), the rack 100 and the cowl 110 may be positioned as illustrated in FIG. 7. In one implementation, a fastener 710 may couple the cowl 110 to the supporting frame 150. The fastener 710 may provide additional support to the cowl 110 to stabilize the cowl 110 while it is mounted on the supporting devices 120. FIG. 7 also illustrates how the lifting crane 185 may be coupled to the lifting hoist 180 and used to lift and rotate the supporting frame 150, as described in step 630 of method 600.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
    a thrust reverser; and
    a rack, comprising:
        a base;
        a supporting frame coupled to and perpendicular to the base; and
        supporting poles configured to receive a core cowl of the thrust reverser for mounting thereon, the supporting poles being:
            coupled to the base and parallel to the supporting frame; and
            configured to be inserted into the core cowl.

2. The system of claim 1, further comprising:
    one or more hinges, wherein the base and the supporting frame are coupled to each other via the one or more hinges.

3. The system of claim 2, wherein the supporting frame and the base are configured to rotate together as one unit around an axis of the one or more hinges.

4. The system of claim 2, further comprising a hydraulic pump disposed proximate a hinge of the one or more hinges to facilitate rotation of the rack about the axis of the one or more hinges.

5. The system of claim 1, further comprising:
    a cross bar connecting two ends of the supporting frame; and
    one or more stabilizers coupled to the cross bar and configured to assist the supporting poles in supporting a weight of a portion of the thrust reverser.

6. The system of claim 5, wherein the one or more stabilizers are adjustable in distance from a respective supporting device.

7. The system of claim 6, wherein the one or more stabilizers and the respective supporting device are configured to fix the thrust reverser cowl relative to the rack.

8. The system of claim 1, further comprising a hoist coupled to the supporting frame, wherein the hoist facilitates a crane to lift the supporting frame.

9. The system of claim 1, further comprising a hoist coupled to the base, wherein the hoist facilitates a crane to lift the base.

10. The system of claim 9, further comprising a second hoist coupled to the supporting frame, wherein the hoist facilitates a crane to lift the supporting frame.

11. A rack for a thrust reverser, comprising:
a base;
a supporting frame coupled to and perpendicular to the base; and
supporting poles configured to receive a core cowl of the thrust reverser for mounting thereon, the supporting poles being:
coupled to the base and parallel to the supporting frame; and
configured to be inserted into the core cowl.

12. The rack of claim 11, further comprising:
one or more hinges, wherein the base and the supporting frame are coupled to each other via the one or more hinges.

13. The rack of claim 12, wherein the supporting frame and the base are configured to rotate together as one unit around an axis of the one or more hinges.

14. The rack of claim 12, further comprising a hydraulic pump disposed proximate a hinge of the one or more hinges to facilitate rotation of the rack about the axis of the one or more hinges.

15. The rack of claim 11, further comprising:
a cross bar connecting two ends of the supporting frame; and
one or more stabilizers coupled to the cross bar and configured to assist the supporting poles in supporting a weight of a portion of the thrust reverser.

16. The rack of claim 15, wherein the one or more stabilizers are adjustable in distance from a respective supporting device.

17. The rack of claim 16, wherein the one or more stabilizers and the respective supporting device are configured to fix the thrust reverser cowl relative to the rack.

18. The rack of claim 11, further comprising a hoist coupled to the supporting frame, wherein the hoist facilitates a crane to lift the supporting frame.

19. The rack of claim 11, further comprising a hoist coupled to the base, wherein the hoist facilitates a crane to lift the base.

20. The rack of claim 19, further comprising a second hoist coupled to the supporting frame, wherein the hoist facilitates a crane to lift the supporting frame.

* * * * *